Figure 1:
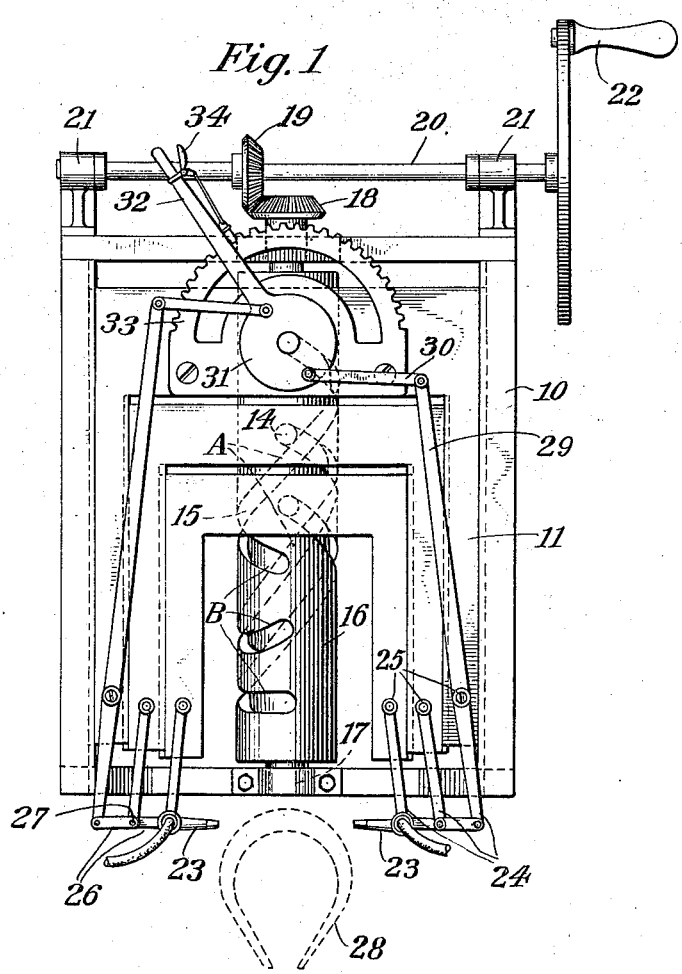

T. MIDGLEY.
TIRE BUILDING MACHINE.
APPLICATION FILED MAR. 18, 1914.

1,161,949.

Patented Nov. 30, 1915.
2 SHEETS—SHEET 1.

Witnesses:
Veronica Braun
Francis Boyle

Inventor
Thomas Midgley
By his Attorney
Ernest Hopkinson

T. MIDGLEY.
TIRE BUILDING MACHINE.
APPLICATION FILED MAR. 18, 1914.
1,161,949.
Patented Nov. 30, 1915.
2 SHEETS—SHEET 2.
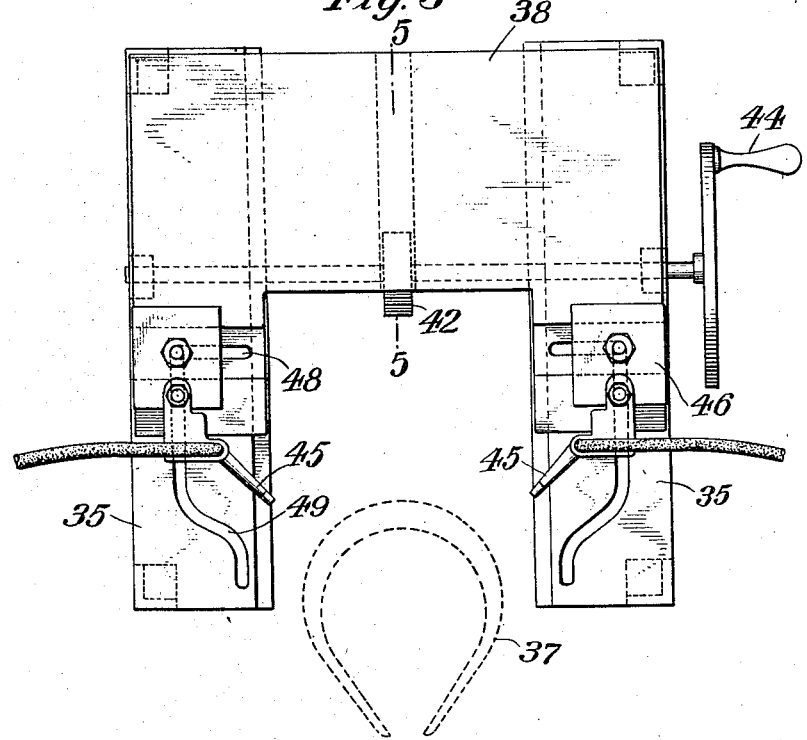
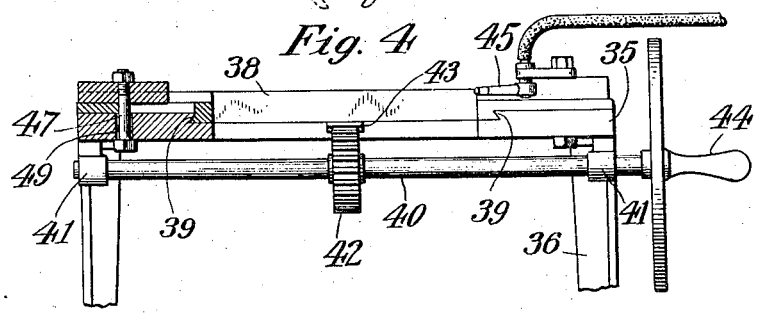
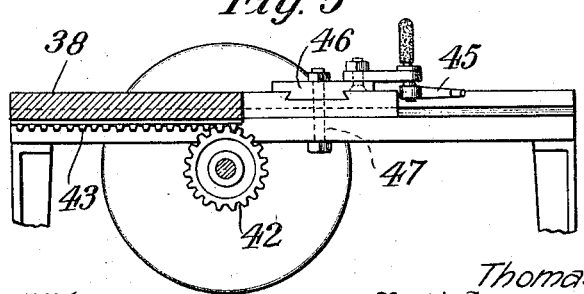
Witnesses:
Veronica Braun
Francis Boyle
Inventor
Thomas Midgley
By his Attorney
Ernest Hopkinson

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

TIRE-BUILDING MACHINE.

1,161,949.          Specification of Letters Patent.     Patented Nov. 30, 1915.

Application filed March 18, 1914. Serial No. 825,483.

*To all whom it may concern:*

Be it known that I, THOMAS MIDGLEY, a citizen of the United States, residing in Worthington, county of Franklin, and State of Ohio, have invented certain new and useful Improvements in Tire-Building Machines, of which the following is a full, clear, and exact disclosure.

This invention relates to the manufacture of tires of the clencher type from flat sheets of fabric, and has for an object to provide an apparatus for shaping the sides of the tires.

In the manufacture of tires, it is customary to apply layers of fabric successively to a tire forming core, each layer as it is applied being centrally pressed against the medial portion of the core and being then pressed at the lateral portions against the sides of the core, this later operation being either manually performed or power performed by radially moving tools such as spinning rolls, disks, and the like.

The present invention provides a novel machine which employs nozzles for discharging compressed air or the like against the sides of the tire whereby the shaping operation is more effectively accomplished than with the usual methods, in that the fabric is not crushed or distorted by the air as from contact with the hard surfaces of tools.

Figure 2:
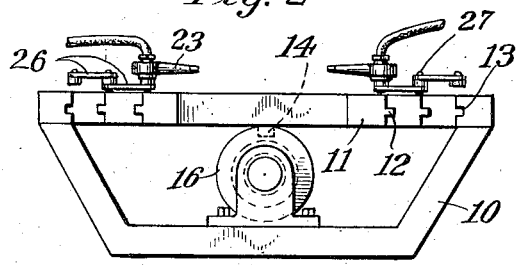

In the drawing I have shown a form of apparatus which is suitable for use in practising my invention, in which drawing:

Figure 1 is a front elevation of the machine; Fig. 2 is an underneath plan view thereof; Fig. 3 is a front elevation of a modified form of the invention; Fig. 4 is an underneath plan view of the modified form with parts in section; Fig. 5 is a longitudinal sectional view on the line 5—5, Fig. 3.

Referring to the drawing, 10 designates a frame which supports a plurality of U shaped slides 11, preferably three in number, which are graduated in size to telescopically fit within each other, and are connected together by tongue and groove guides 12, the outermost slide being connected to the frame by a tongue and groove guide 13. The slides carry respective pins 14 which fit in corresponding spiral cam slots 15 formed in a longitudinally disposed cylinder 16 that is mounted in suitable bearings 17 on the frame. Meshing bevel gears 18 and 19 connect the cylinder for rotation with the drive shaft 20 which is mounted in suitable bearings 21 on the frame, and is preferably driven by a crank handle 22. During rotation of the cylinder the slots 15 move the pins 14 in alinement longitudinally of the cylinder and impart corresponding movement to the respective slides.

A pair of air nozzles 23 are directed toward each other on opposite sides of the frame and each is connected to the legs of the slides at the corresponding side of the frame by a link mechanism which comprises parallel links 24 which are pivoted to corresponding slides as at 25 and are terminally connected together by transverse links 26 which are pivoted to the parallel links as at 27. The nozzles are so spaced apart as to receive the tire 28 therebetween. Upon actuation of the slides the nozzles are moved radially along the sides of the tire and are at the same time inclined through the instrumentality of the link mechanisms to shape the tire to the core as will now be more fully described.

The spiral cam slots 15 which control the movements of the slides are of substantially uniform pitch near the outer end of the cylinder as shown at A, and move the slides initially as a unit. They change, however, both in pitch and in relative direction near the inner end of the cylinder as shown at B, and move the slides in their final stages of movement independently of each other, both in direction and speed. During the initial movement of the slides as a unit the link mechanisms move the nozzles radially of the tire to discharge against the medial portion of the tire and shape it to the form. During the final stages of movement of the slides the link mechanisms move the nozzles radially and simultaneously rock them to successive predetermined receding angular positions relative to the plane of the core for discharging against the sides of the tire at the angles necessary to most effectively shape them to the core.

For adjusting the nozzles laterally with respect to the tire, the outermost links of the link mechanisms are extended beyond their pivots as shown at 29, and are terminally connected by links 30 to opposite points on a disk 31 which is pivoted on the outermost slide, the disk being equipped with an integral lever 32 which is locked in adjusted positions on a notched segment 33 by a latch 34. Shifting of this lever serves to space the discharge ends of the nozzles at any required distance from the sides of the tire to adjust the device for various conditions of service or sizes of tires.

I do not limit myself to air as the pressure agent, equivalents being possible. Except when expressly specified in the claims, I do not limit myself to links or telescopically united slides for operating the nozzles, nor to the more particular construction of cam cylinder mentioned, it being only essential to the practice of the invention that a fluid under pressure be directed in a controllable stream against the tire to shape it to the core form.

A modified form of the device is shown in Figs. 3 to 5 inclusive, in which 35 designates supporting bars that are equipped with legs 36 and are so spaced apart as to receive the tire 37 therebetween. A U shaped slide 38 is dovetailed in the bars as at 39 and is actuated by a shaft 40 which is journaled in bearings 41 on the bars and which has a pinion 42 engaging a rack 43 on the slide, the shaft being preferably driven by a crank handle 44.

A pair of nozzles 45 are mounted on the slide and are manipulated in unison to discharge at the proper angles against the sides of the tire by the following mechanism. Each nozzle is mounted on a block 46 which is dovetailed to slide transversely on the slide, the block carrying a guide pin 47 which passes through a transverse slot 48 in the slide and through a longitudinal curvilinear slot 49 in the supporting bar. During advance of the slide longitudinally of the frame bars the nozzles will be directed by the action of the slots on their guide pins to move radially of the tire and at the same time to assume such receding angular positions relative to the plane of the tire as to deliver their streams at the necessary angles to effectively shape the sides of the tire to the core.

The operations of both the preferred and modified forms of the invention are substantially the same so that a description of the operation of the preferred form will suffice for both. The frame 10 is first juxtaposed to the core as shown in Fig. 1. As each layer of fabric is applied in succession to form the tire the drive shaft 20 is actuated to advance the slides radially of the tire and simultaneously operate the link mechanisms to incline the nozzles with respect to the plane of the tire whereby the pressure of the compressed air against the sides of the tire effectively shapes the tire to the configuration of the core without mutilating or crushing the fabric.

Having thus described my invention, what I claim and desire to have protected by Letters Patent is:

1. A tire building machine embodying a tire forming core, a support in juxtaposition to the core, and a nozzle mounted on the support to move relatively and discharge a pressure medium against the tire.

2. A tire building machine embodying a tire forming core, a support in juxtaposition to the core, and a nozzle mounted on the support to pass radially along the side of the tire and discharge a pressure medium thereagainst.

3. A tire building machine embodying a tire forming core, a support in juxtaposition to the core, and a nozzle mounted on the support to pass radially along the side of the tire at an angle thereto and discharge a pressure medium against the tire.

4. A tire building machine embodying a tire forming core, a support in juxtaposition to the core, and a nozzle mounted on the support to pass radially along the side of the tire at a receding angle thereto and discharge a pressure medium against the tire.

5. A tire building machine embodying a tire forming core, a support in juxtaposition to the core, nozzles positioned thereon to discharge pressure mediums against opposite sides of the tire, and means for moving the nozzles in unison radially along the sides of the tire.

6. A tire building machine embodying a tire forming core, a support in juxtaposition to the core, nozzles positioned thereon for discharging pressure mediums against the sides of the tire, and slides for moving the nozzles radially along the sides of the tire.

7. A tire building machine embodying a tire forming core, a support in juxtaposition to the core, nozzles therein for discharging pressure mediums against the sides of the tire, and link mechanisms for inclining the nozzles with respect to the plane of the tire.

8. A tire building machine embodying a tire forming core, a support in juxtaposition to the core, a nozzle for discharging a pressure medium against the tire and mounted on the support for radial movement with respect to the tire, and means for adjusting the nozzle laterally with respect to the tire.

9. A tire building machine embodying a tire forming core, a support in juxtaposition to the core, a slide mounted on said support for radial movement with respect to the tire, a member mounted on said slide for transverse movement with respect to the tire, and a nozzle carried by said member for discharging a pressure medium against the tire.

10. A tire building machine embodying a tire forming core, a support in juxtaposition to the core, a nozzle for discharging a pressure medium against the side of the tire, a cam on said support, telescopically united slides operated by the cam for independent radial movement with respect to the tire, and a link mechanism connecting said nozzle to said slides and actuated by the independent movement of the slides to incline said nozzle with respect to the plane of the tire.

11. A tire building machine embodying a tire forming core, a support in juxtaposition to the core, a slide mounted on said support for radial movement with respect to the tire, there being a transverse slot in said slide and a longitudinal curvilinear slot in said support registering with said transverse slot, a block on said guide having a projection entering into said registering of slots, and a nozzle on said block for discharging a pressure medium against the tire.

Signed at Detroit, county of Wayne, State of Michigan, this 13th day of March, 1914.

THOMAS MIDGLEY.

Witnesses:
  E. LA BUSCHEWSKY,
  J. H. SWIFT.